May 2, 1944. W. O. RUNCIE 2,348,153

FILM MAGAZINE

Filed Aug. 14, 1941

Inventor
Walter Osborne Runcie

By Lacey & Lacey, Attorneys

Patented May 2, 1944

2,348,153

UNITED STATES PATENT OFFICE 2,348,153

FILM MAGAZINE

Walter O. Runcie, Lima, Peru, assignor of twenty-five per cent to Harold L. Price, Alexandria, Va.

Application August 14, 1941, Serial No. 406,914

1 Claim. (Cl. 88—17)

This invention relates to an improved film magazine and more particularly to a pre-loaded film magazine for use with cinematographic cameras.

Pre-loaded film magazines, as manufactured up to the present time, are so constructed that the film, as it unwinds from the supply spool and moves past the film gate to the take-up spool, is forced to follow a long and tortuous path, with the result that great strain is placed upon the camera mechanism and jams frequently occur.

One object of my invention, therefore, is to provide a film magazine wherein the supply spool, the take-up spool, and the gearing associated therewith, are so mounted that the film will be allowed to follow an unimpeded path from the supply spool to the take-up spool, so that jamming and undue strain on the camera mechanism will be avoided.

A further object of the invention is to provide a film magazine which is characterized by simplicity in construction and efficiency in operation.

Still another object of the invention is to provide a film magazine which may be manufactured cheaply.

Another object of the invention is to provide a film magazine wherein the supply spool and take-up spool are so mounted within the container or housing employed that the film will not, when unwinding from said supply spool, be required to follow through reverse and right angle curves, but will follow through easy arcs.

Other objects of the invention, not particularly mentioned in the foregoing, will become apparent during the course of the following description.

Figure 1:
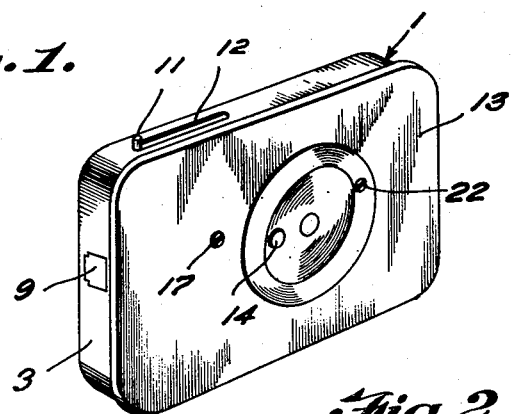
Fig. 1 is a perspective view of my improved film magazine.

Referring more particularly to the drawing, wherein like numerals of reference designate like parts throughout the views, the numeral 1 indicates, generally, the casing or container of my improved film magazine. The container 1 includes a rear wall 2 and a continuous side wall 3, said side wall having curved end portions 4. As best seen in Fig. 1, the side wall 3 at the front of the casing is formed with an exposure opening 9 which, of course, is associated with film gate mechanism 10, of known design. The film gate mechanism is controlled by a pin 11 which is slidable in a slot 12 in the top wall section 7.

Normally closing the container is a detachable cover 13. An exposure indicator 14 is mounted on the cover 13 and cooperates with the film supply spool to be described hereinafter.

In order to mount a film for rotative movement in the magazine 1, I provide a supply spool 15, said supply spool being rotatable about a stem 16 which is fixed to the rear wall 2 near the forward end thereof. The free end of the stem is counterbored and internally threaded to receive a securing screw 17 for retaining the cover 13 in place. The supply spool 15 carries a roll of film 18 thereon.

Figure 2:
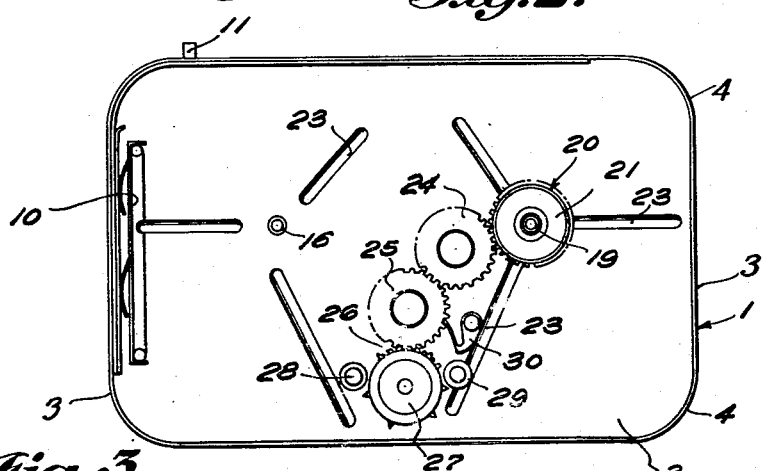
Fig. 2 is a side elevation, on an enlarged scale, of the film magazine with the cover, the supply spool and the take-up spool removed, and particularly showing the gearing employed.

A stem 19 is also mounted within the container near the rear end thereof. As best seen in Fig. 2, the stem 19 rotatably receives a take-up spool 20, said take-up spool having a gear 21 thereon, said gear meshing with other gears to be described hereinafter. The stem 19 is, like the stem 16, counterbored and threaded to receive a screw 22 for securing the cover 13 in place. The take-up spool 20 has the free end of the roll of film 18 secured thereto so that, as the film unwinds from the supply spool 15, it will wind upon the take-up spool 20. In order to space the film from the rear wall 2 of the container, inwardly pressed ribs 23 are employed, said ribs being disposed in radial relation with respect to both the stem 16 and the stem 19.

It is desired to state that, in the construction of my improved film magazine, the numbering on the disc of the conventional footage indicators will have to be transposed. This transposition will be necessary in view of the fact that in the construction of my invention, the positions of the supply spool 18 and the take-up spool 20 will be reversed from the positions of such spools in a conventional film magazine. The indicator disc pin operates in conjunction with the film on the supply spool in the conventional construction while, in the construction of my invention, the indicator disc pin operates in conjunction with the film on the take-up spool.

In order to feed the film from the roll of film 18, on the supply spool 15, past the film gate mechanism 10, and onto the take-up spool 20, I provide mechanism including gears 24 and 25, said gears being mounted on the rear wall 2 in meshing relation to each other. As best seen in Fig. 2, the gear 24 meshes with the gear 21 on the take-up spool 20. The gear 25, in addition to meshing with the gear 24, also meshes with a gear 26 which is formed on a feeder sprocket 27, said feeder sprocket having a pair of idlers 28 and 29 disposed in association therewith. A pawl 30 is rigidly mounted on the wall 2 and is engageable with the gear 25 for limiting said gear against any but unidirectional rotative movement.

Figure 3:
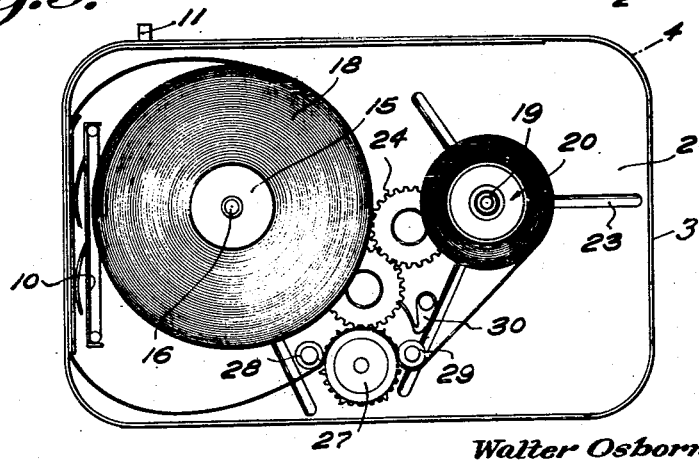
Fig. 3 is a side elevation, also on an enlarged scale, of the device, and showing the supply spool, the take-up spool and film as they would appear in proper operative position.

In use, the film is led from the roll 18 past the film gate mechanism. Said film is trained about the feeder sprocket 27 and partially about the idlers 28 and 29. Thence, as stated, the film is trained about the take-up spool 20. In this connection, it is desired to state that the film is wound about the spool, emulsion side out. This is done for the purpose of eliminating the necessity of training the film to move through a reverse curve, movement of film in such manner requiring much greater pulling strain upon the camera mechanism. As seen in Fig. 3, when the feeder sprocket 27 is rotated by the camera mechanism, the film will feed from the roll 18 in easy arcs and will not be required to pass through reverse, right angle, or other abrupt turns. It is desired to direct attention to the fact that the conventional spring tooth, disposed at the film gate 9, will cooperate with the sprocket 27 and pawl 30 and maintain a constant loop in the film. Film jams will thus be avoided. Much greater ease of operation, with a corresponding minimum of strain upon the operating mechanism of the camera, will thus be assured. Moreover, separators and guides, which are now commonly employed for retaining the film on its proper course, will not be needed with my improved film magazine.

My improved pre-loaded magazine may be manufactured without materially altering machinery employed for manufacturing magazines as now constructed. It is obvious, therefore, that the improved film magazines may be quickly and cheaply placed in production. Moreover, the invention will be entirely trouble-proof and fool-proof in operation.

Having thus described the invention, what is claimed as new is:

A pre-loaded film magazine including a casing having a detachable cover and provided with an exposure opening, spaced stems disposed within the casing and secured to one wall thereof, the free ends of said stems being provided with threaded openings, a film supply spool rotatably mounted on one of said stems, a take-up film spool rotatably mounted on the other stem, said take-up spool having a gear, a feeder sprocket rotatably mounted within the casing adjacent the lower portion thereof and provided with a gear, idle rollers disposed at opposite sides of the feeder sprocket, gears meshing with each other and with the gears on the take-up sprocket and feeder sprocket respectively, a pawl engaging one of said gears for limiting said gear against any but uni-directional rotative movement, the film from the supply spool being extended downwardly across the exposure opening and thence laterally over the feed sprocket and under the idle rollers to said take-up spool, and screws passing through the cover and engaging the threaded openings in the stems for detachably holding the cover in position on the casing and preventing displacement of the spools and their associated parts.

WALTER O. RUNCIE.